(12) United States Patent
Paoff et al.

(10) Patent No.: US 11,773,957 B2
(45) Date of Patent: Oct. 3, 2023

(54) SYSTEMS FOR ELECTRIC VEHICLE

(71) Applicant: Dana Automotive Systems Group, LLC, Maumee, OH (US)

(72) Inventors: John Paoff, Toledo, OH (US); Seth Metzger, Monclova, OH (US); Brian Thisse, Holly, MI (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 130 days.

(21) Appl. No.: 17/228,459

(22) Filed: Apr. 12, 2021

(65) Prior Publication Data
US 2021/0317907 A1 Oct. 14, 2021

Related U.S. Application Data

(60) Provisional application No. 63/009,359, filed on Apr. 13, 2020.

(51) Int. Cl.
*F16H 57/037* (2012.01)
*F16H 57/027* (2012.01)
*F16H 57/025* (2012.01)
*F16H 57/04* (2010.01)

(52) U.S. Cl.
CPC ......... *F16H 57/037* (2013.01); *F16H 57/025* (2013.01); *F16H 57/027* (2013.01); *F16H 57/046* (2013.01); *F16H 57/0423* (2013.01); *F16H 57/0424* (2013.01); *F16H 57/0436* (2013.01); *F16H 57/0471* (2013.01)

(58) Field of Classification Search
CPC .... F16H 57/037; F16H 57/025; F16H 57/027; F16H 57/0423; F16H 57/0424; F16H 57/0436; F16H 57/046; F16H 57/0471; F16H 2200/0021; F16H 57/043; F16H 57/0426; B60Y 2200/91
See application file for complete search history.

(56) References Cited

U.S. PATENT DOCUMENTS

| 3,145,582 | A | * | 8/1964 | Wagner | F16H 57/027 74/606 R |
|---|---|---|---|---|---|
| 4,986,144 | A | * | 1/1991 | Kobayashi | F16H 57/033 74/606 R |
| 2013/0145879 | A1 | * | 6/2013 | Nakamura | F16H 57/043 74/467 |
| 2021/0270360 | A1 | * | 9/2021 | Asano | F16H 57/0408 |

FOREIGN PATENT DOCUMENTS

| CN | 105757210 A | * | 7/2016 | ... F16H 2057/02034 |
|---|---|---|---|---|
| CN | 108001190 A | * | 5/2018 | ............... B60K 6/24 |
| DE | 102013012718 A1 | * | 2/2015 | ........... F16H 57/025 |

OTHER PUBLICATIONS

Translation of DE102013012718A1 (Year: 2022).*
Translation of CN 105757210 A (Year: 2022).*
Translation of CN 108001190 A (Year: 2022).*

* cited by examiner

*Primary Examiner* — Thomas C Diaz
(74) *Attorney, Agent, or Firm* — McCoy Russell LLP

(57) ABSTRACT

Systems are provided for a gear set housing. In one example, a system comprises a gear box housing configured to house a four stage gear set in combination with a shift actuator and a differential lock, wherein the four stage gear set comprises an input shaft, a first layshaft, a second layshaft, and an output shaft.

17 Claims, 14 Drawing Sheets

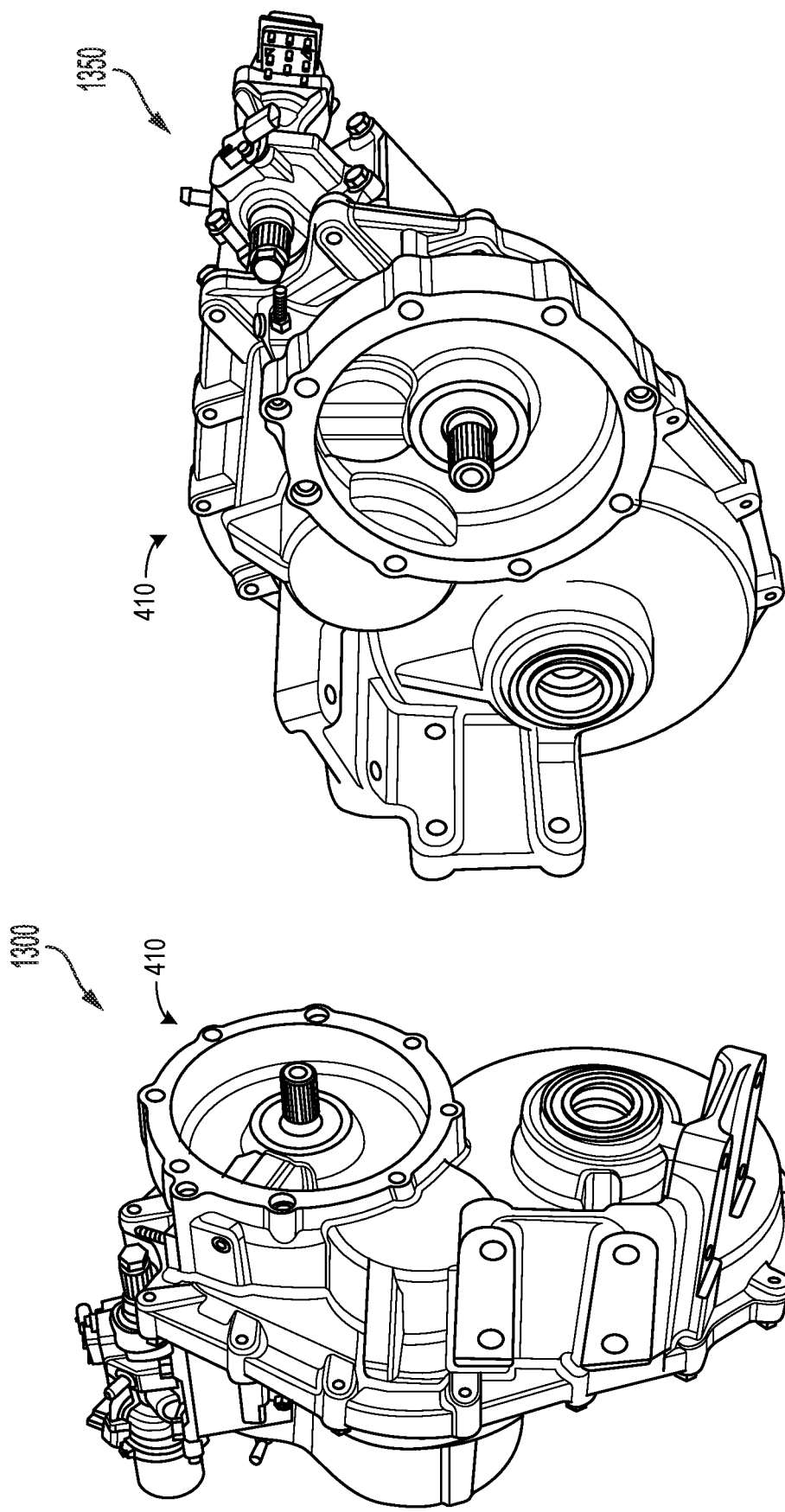

SYSTEMS FOR ELECTRIC VEHICLE

CROSS-REFERENCE TO RELATED APPLICATION

The present application claims priority to U.S. Provisional Patent Application No. 63/009,359, entitled "SYSTEMS FOR AN ELECTRIC VEHICLE," and filed on Apr. 13, 2020. The entire contents of the above-listed application are hereby incorporated by reference for all purposes.

TECHNICAL FIELD

The present description relates generally to a partially electric or a fully electric vehicle comprising independent gear sets.

BACKGROUND & SUMMARY

Vehicles, such as passenger trucks, may be equipped with a gearbox configured to control a vehicle speed/torque and/or a tow speed/torque. Some vehicles may comprise a front axle gear box and a rear axle gear box comprising independent gear sets. However, this may increase packaging constraints.

In one example, a system, comprises a gear box housing configured to house a multi-stage gear set in combination with a shift actuator and a differential lock, wherein the four stage gear set comprises an input shaft, a first layshaft, a second layshaft, and an output shaft.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 13A and 13B illustrate a first shaft orientation and a second shaft orientation of the gear box housing, respectively.

FIGS. 2 through 13B are shown approximately to scale. However, other relative dimensions may be used if desired.

DETAILED DESCRIPTION

Figure 1:
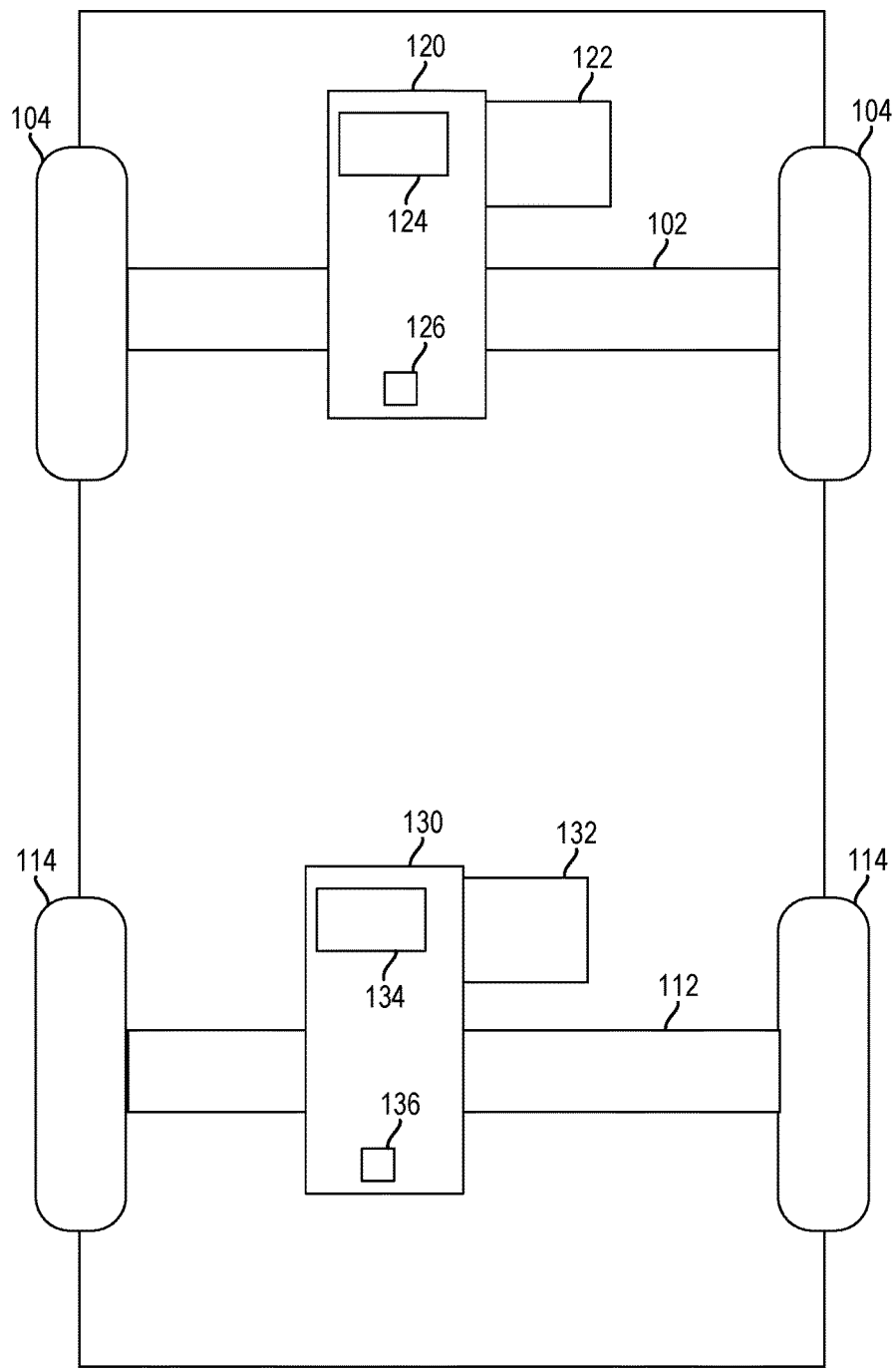
FIG. 1 shows a schematic of a vehicle comprising two independent gear boxes.

The following description relates to systems for a vehicle comprising independent gear boxes. In one example, a first gear box is an independent gear box arranged on a front shaft and a second gear box is an independent gear box arranged on a rear shaft, as illustrated in FIG. 1. The first gear box may be configured to adjust a vehicle speed and the second gear box may be configured to adjust a tow speed. As known to those of ordinary skill in the art, a gear box may provide torque multiplication by allowing an output shaft to rotate slower than an input shaft. The reduction in speed of the output shaft relative to the input shaft may result in a mechanical advantage, such as increased torque or speed.

Figure 2:
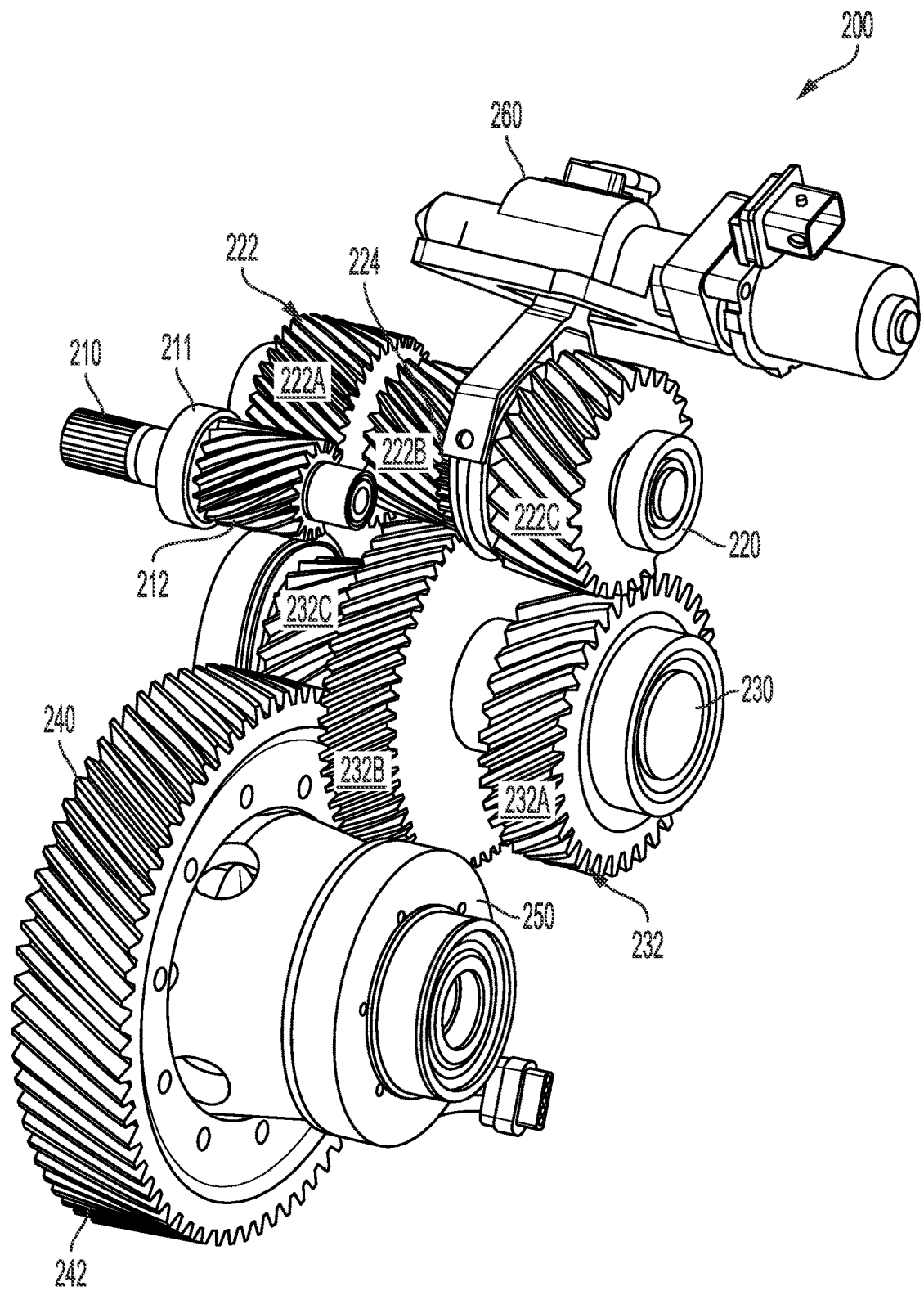
FIG. 2 shows a layout of a single gear set.
Figure 3:
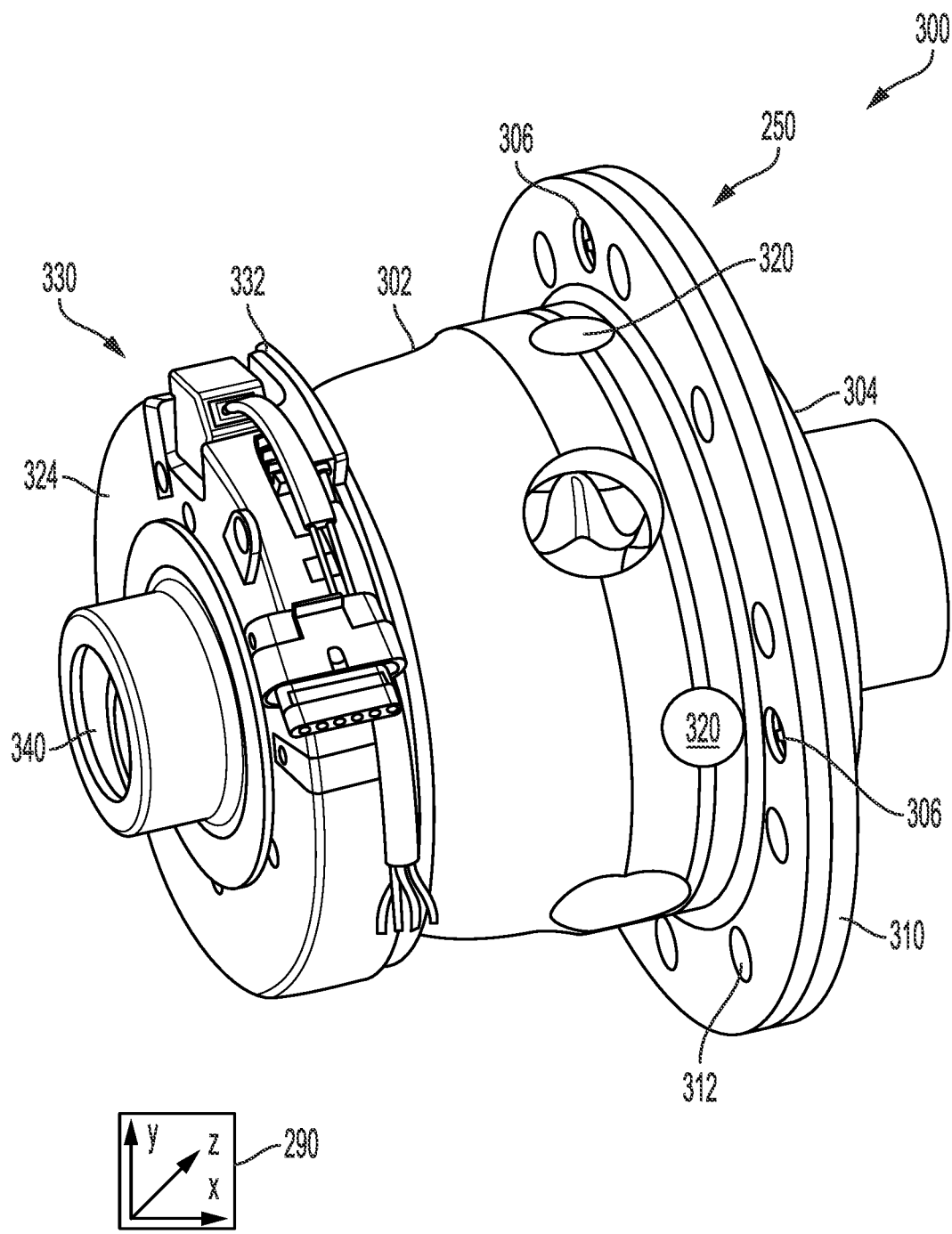
FIG. 3 shows an electronic differential lock.

For vehicles comprising two or more gear boxes, packaging constraints may become an issue. To at least partially solve this, the inventors have configured a more narrow multi-stage gear set as illustrated in FIG. 2. A differential lock may be included with an output shaft to provide all-wheel drive capabilities, wherein the differential lock is illustrated in FIGS. 2 and 3.

Figure 4A:
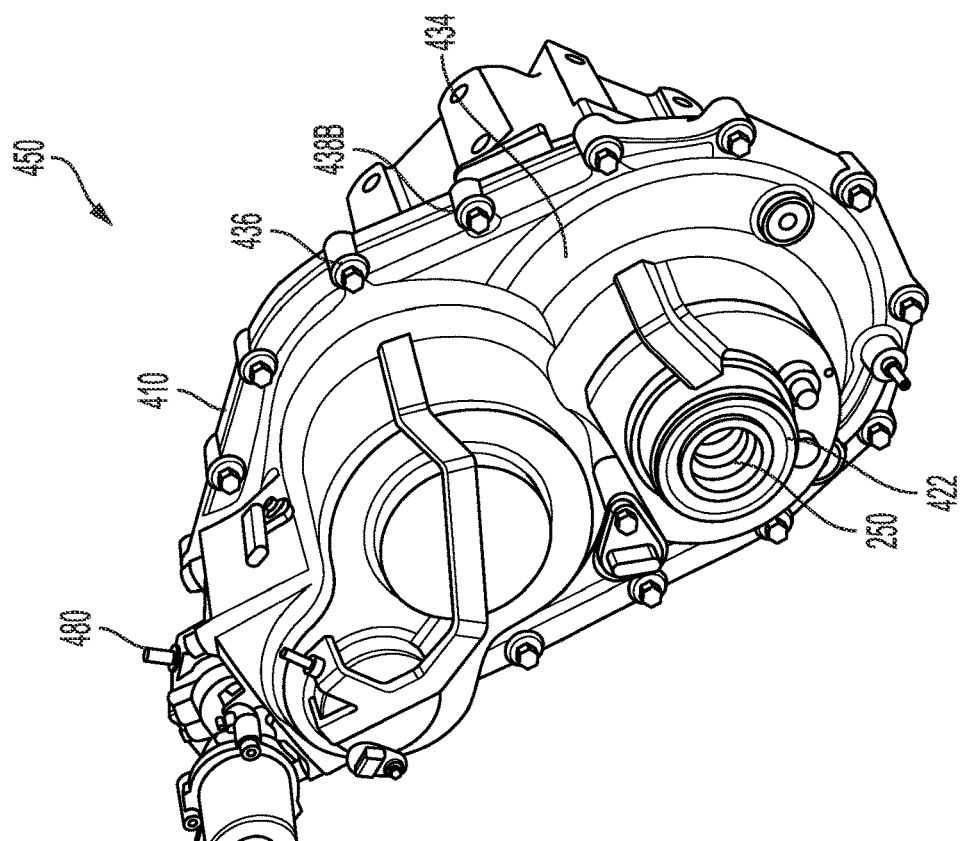
FIGS. 4A and 4B show front and back side views of a gear box housing, respectively.
Figure 4B:
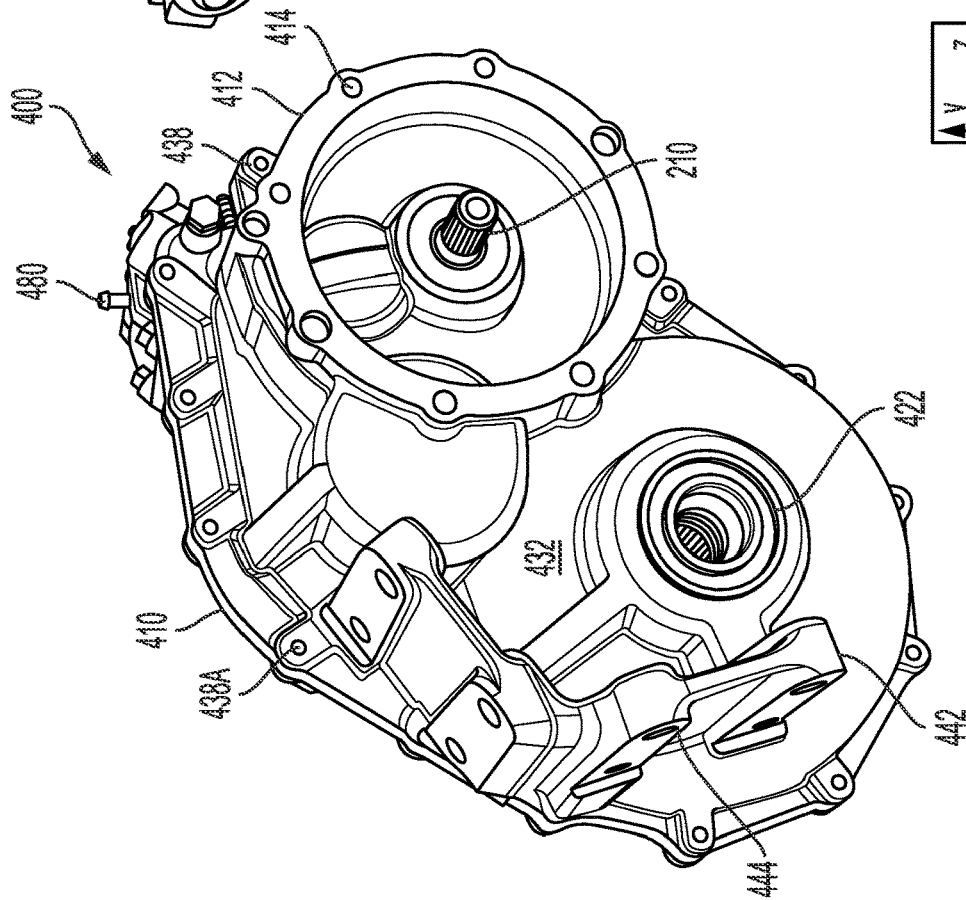
Figure 5C:
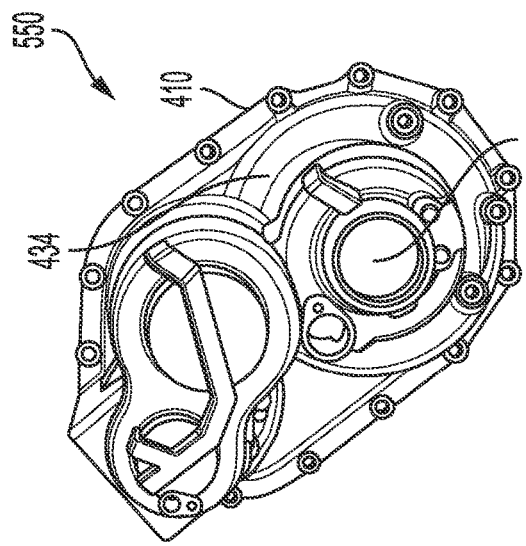
FIGS. 5C and 5D show exterior and interior views of a second half of the gear box housing, respectively.
Figure 5D:
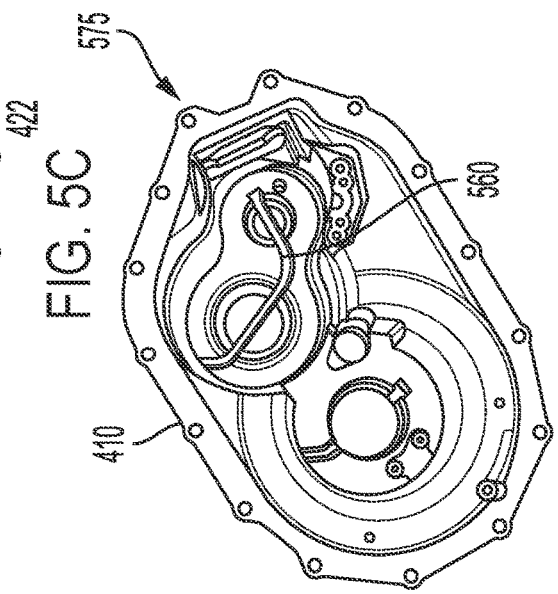
Figure 5A:
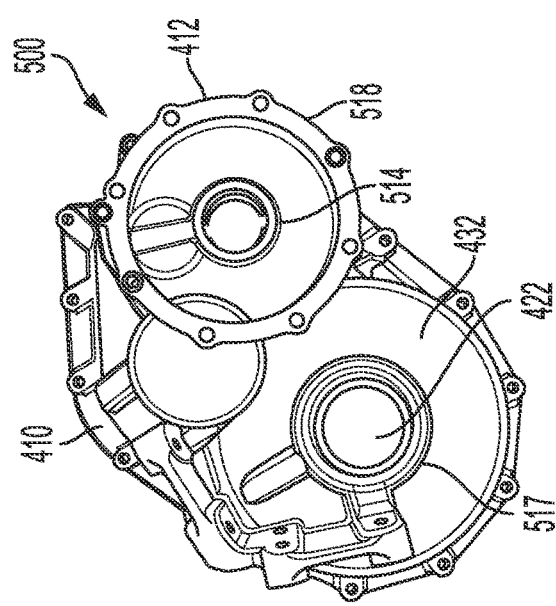
FIGS. 5A and 5B show exterior and interior views of a first half of the gear box housing, respectively.
Figure 5B:
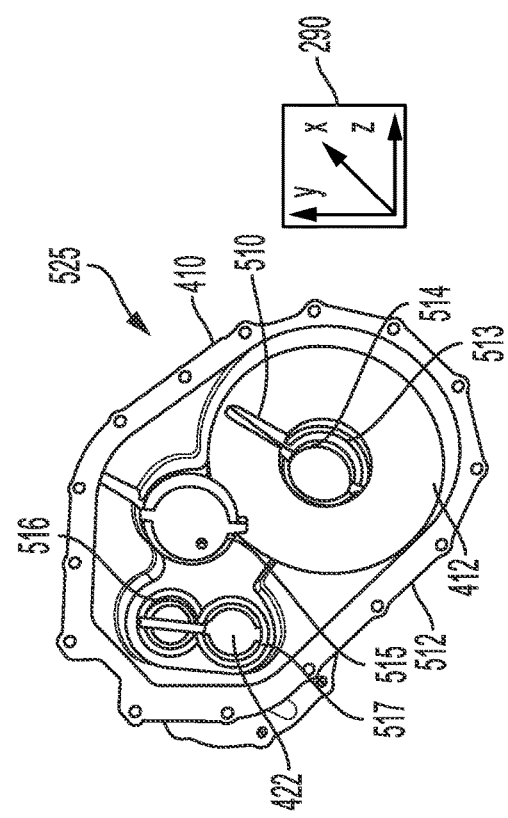

An embodiment of the gear box housing is illustrated in FIGS. 4A and 4B. The gear box housing comprises a reduced packaging size despite being configured to house the multi-stage gear set along with the differential lock and an actuator, such as a shift actuator. In one example, a first half of the gear box housing is shown in FIGS. 5A and 5B. A second half of the gear box housing is shown in FIGS. 5C and 5D. In one example, a shape and size of the first half and second half embodiments of the gear box housings may be substantially similar, wherein an arrangement of oil ports and vent valves may differ between the embodiments. Furthermore, orientations of the gear box housings on the first shaft and the second shaft may differ, while still positioning the oil ports in a desired position to maintain a desired lubricant flow rate and the vent valves in a highest position of the gear box housing.

Figure 6A:
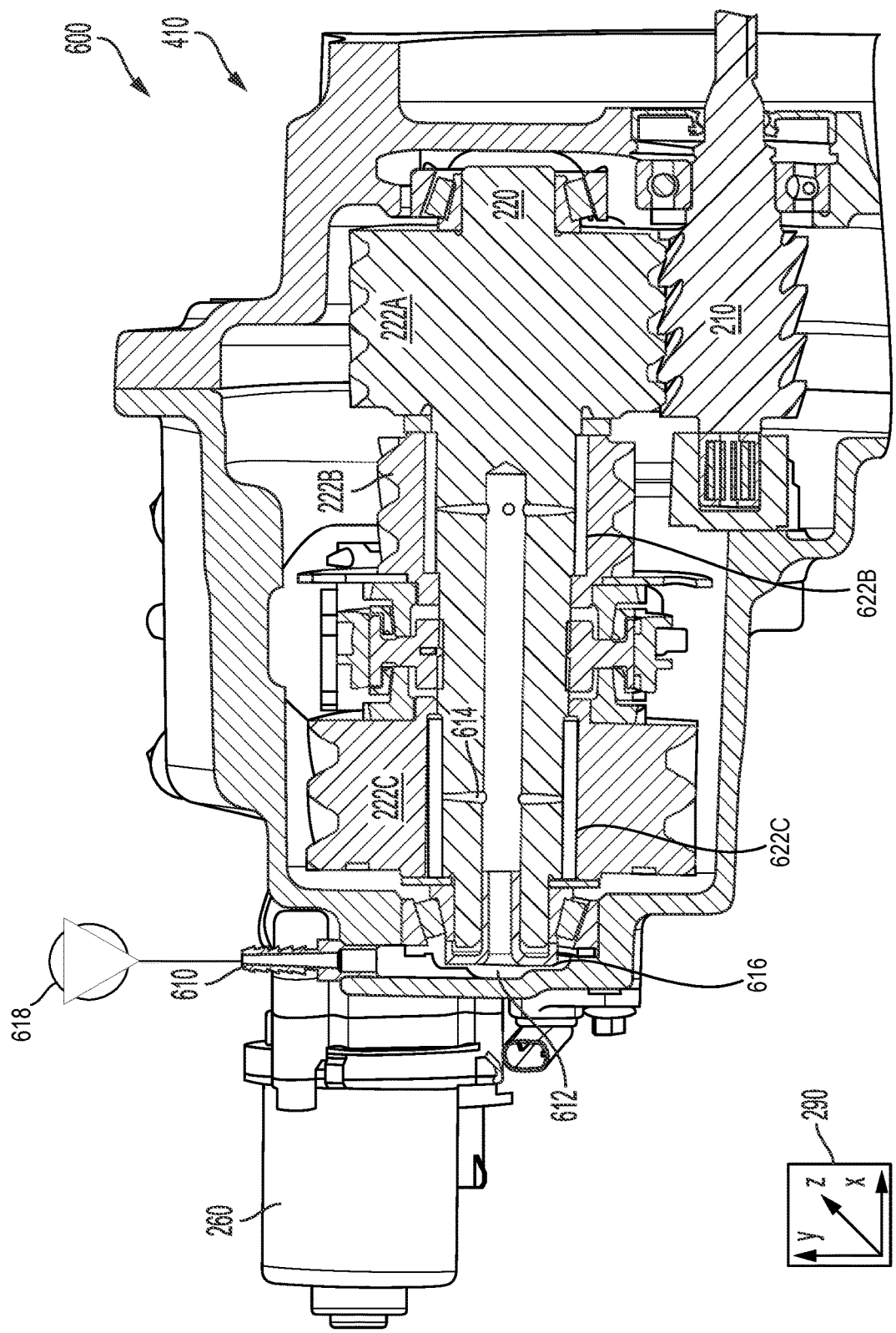
FIG. 6A shows a cross-section of the first independent gear box along with an arrangement of an oil port.
Figure 6C:
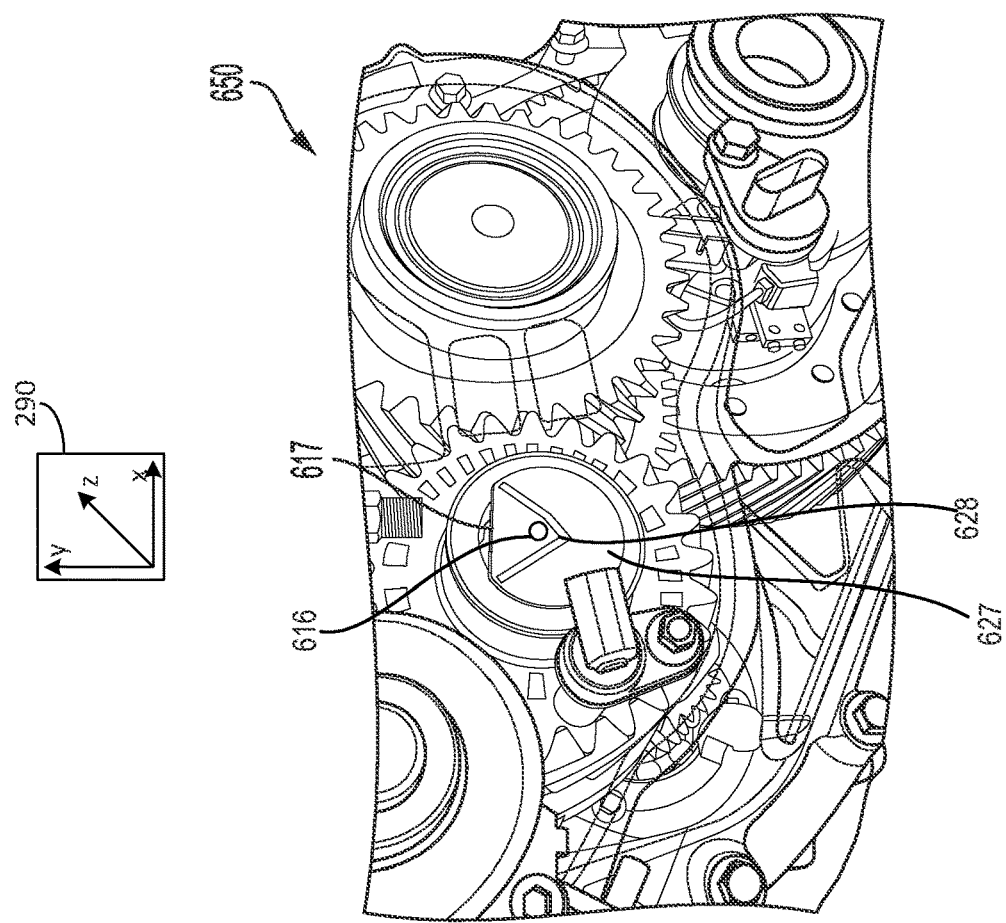
FIGS. 6B and 6C show a detailed view of a flow tube.
Figure 6B:
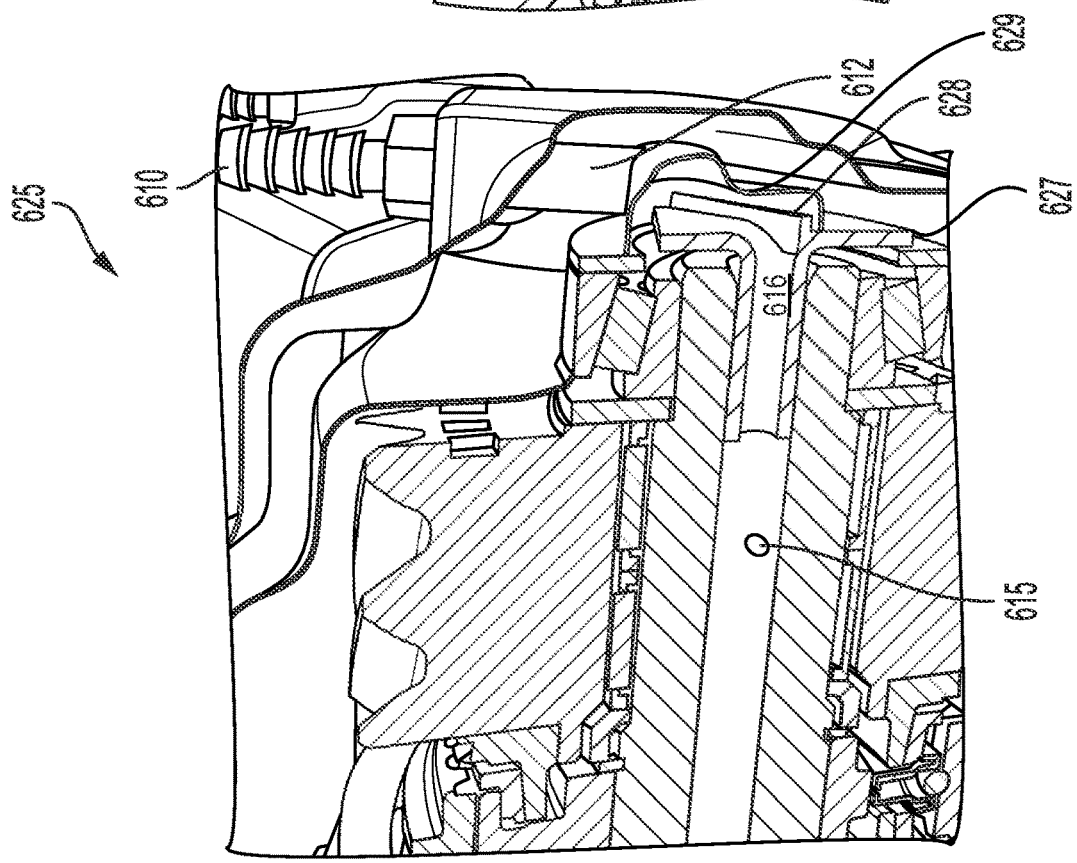
Figure 7:
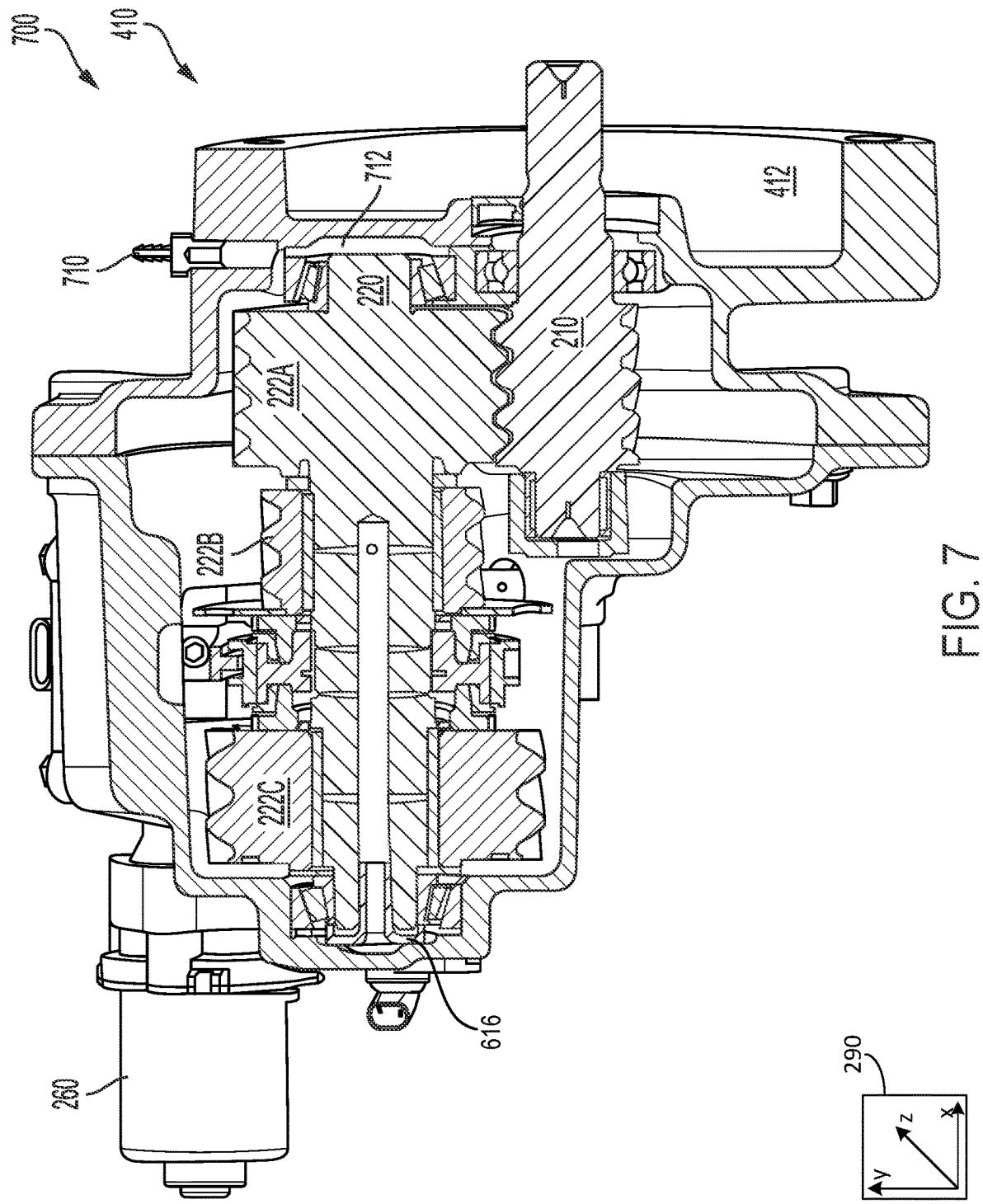
FIG. 7 shows a cross-section of the second independent gear box along with an arrangement of an oil port.
Figure 8:
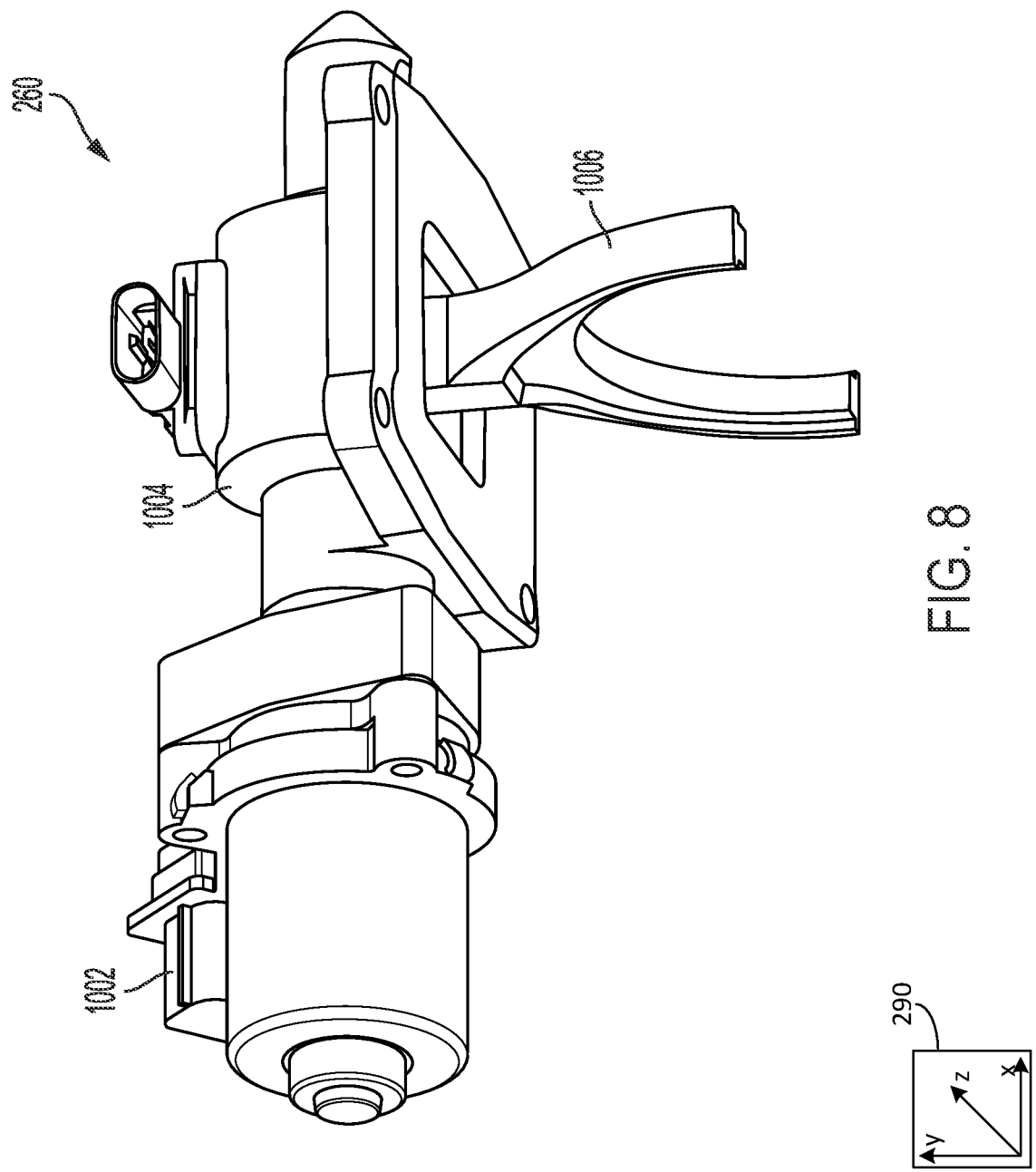
FIG. 8 shows an actuator assembly.
Figure 9:
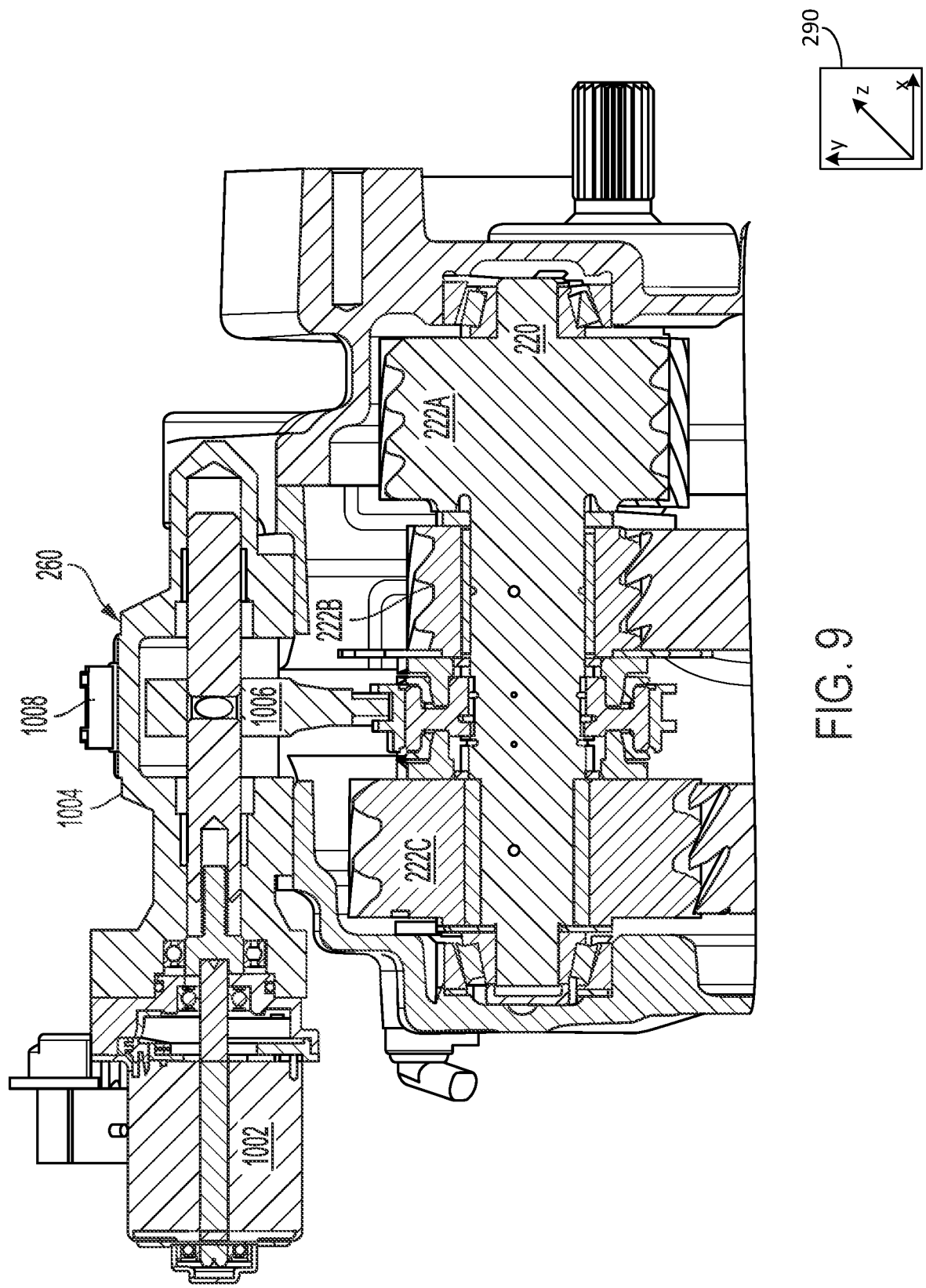
FIG. 9 shows the actuator assembly coupled to a gear set.
Figure 10:
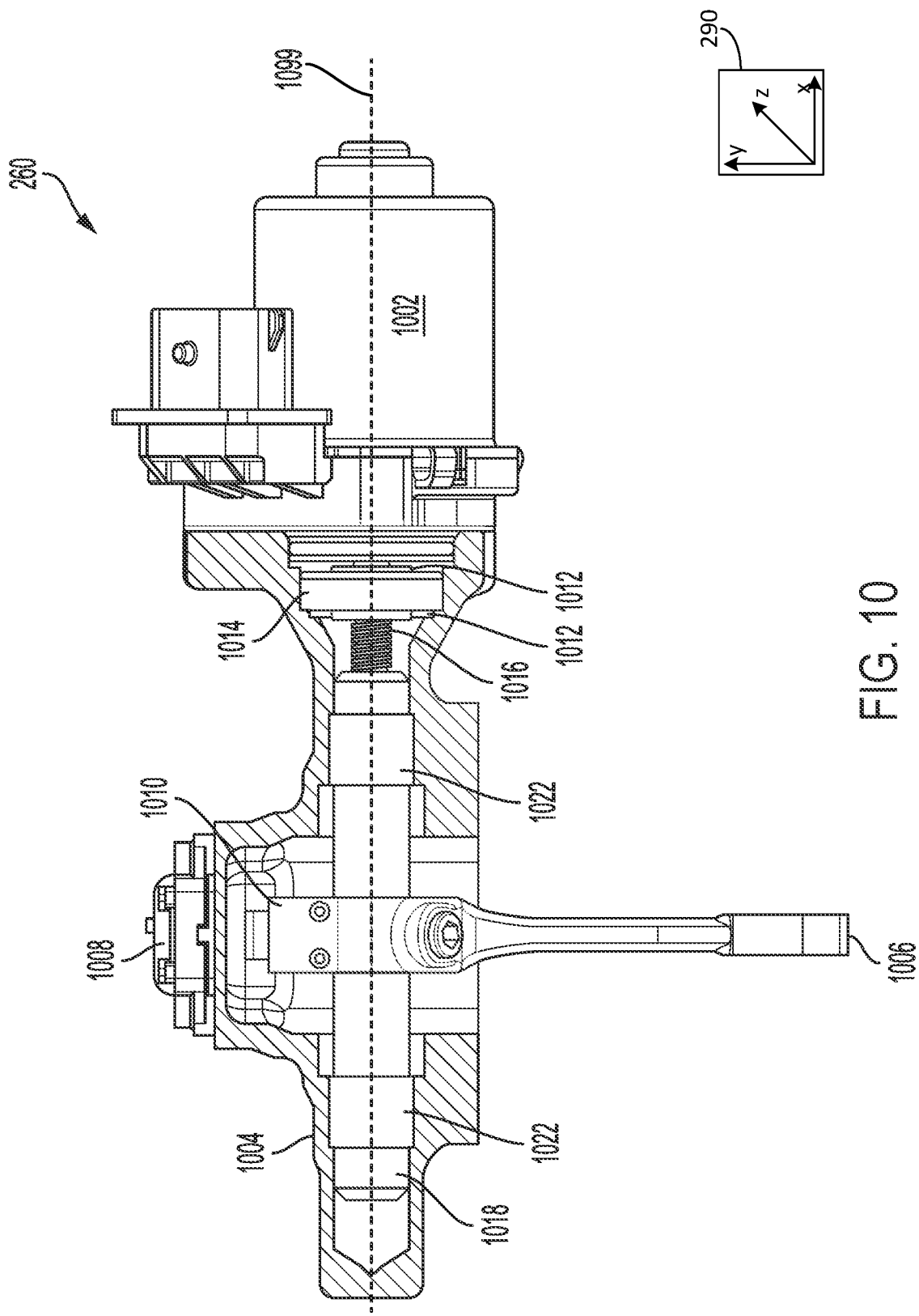
FIG. 10 shows an internal view of the actuator assembly.
Figure 11:
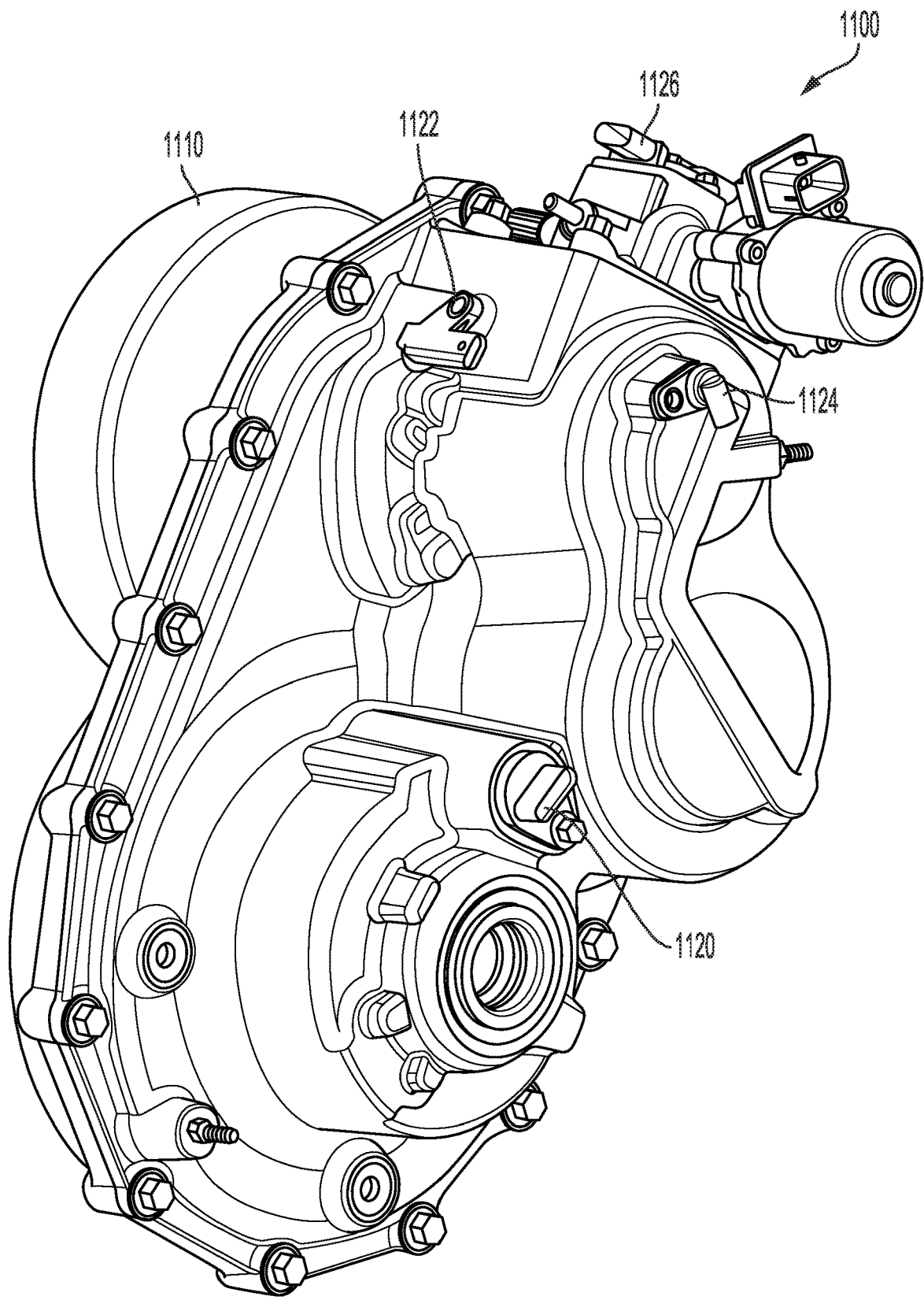
FIG. 11 shows an arrangement of one or more sensors on the gear box housing.
Figure 12:
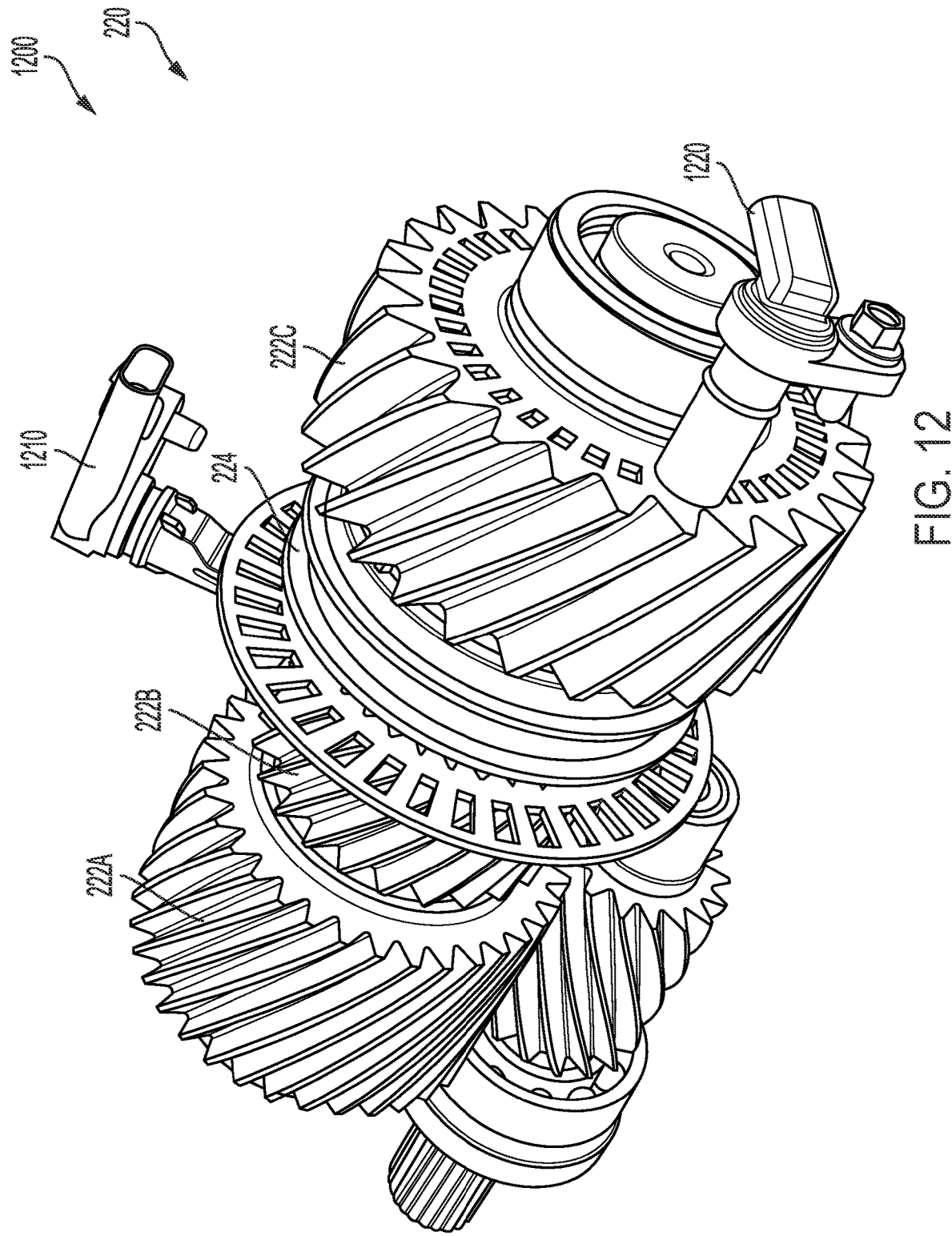
FIG. 12 shows a crawl gear and a cruise gear of the gear set.

A cross-section of the gear box housing arranged on the first shaft is illustrated in FIG. 6A and a more detailed view of a flow tube is illustrated in FIGS. 6B and 6C. A cross-section of the gear box housing arranged on the second shaft is illustrated in FIG. 7. The actuator, which may be a shift actuator, is illustrated in FIGS. 8, 9, and 10. Sensors of the gear box housings are illustrated in FIG. 11. An embodiment of a first layshaft of the gear set is illustrated in FIG. 12. FIGS. 13A and 13B illustrate a first shaft orientation and a second shaft orientation of the gear box housing, respectively.

FIGS. 1-13B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Turning now to FIG. 1, it shows a vehicle 100 comprising a first shaft 102 and a second shaft 112. The first shaft 102 may be configured to drive a first set of wheels 104 and the second shaft 112 may be configured to drive a second set of wheels 114. In one example, the first shaft 102 is arranged near a front of the vehicle 100 and the second shaft 112 is arranged near a rear of the vehicle 100. In some embodiments, the first shaft 102 may be arranged near the rear of the vehicle 100 and the second shaft 112 may be arranged near the front of the vehicle.

A first gear box 120 may be arranged on the first shaft 102. A shift motor 122 may be coupled to the first gear box 120. The first gear box 120 may include a first gear set 124 and an electronic differential lock 126.

A second gear box 130 may be arranged on the second shaft 112. A shift motor 132 may be coupled to the second gear box 130. The second gear box 130 may include a second gear set 134 and an electronic differential lock 136. One or more of the first gear box 120 and the second gear box 130 may include a manual or electronic parking brake.

In one example, the first gear box 120 and the second gear box 130 may include similar housings. More specifically, a housing of the first gear box 120 may be substantially identical to a housing of the second gear box in size and shape. Differences between housings of the first gear box 120 and the second gear box 130 may include an orientation thereof along with a location of an oil port and a vent valve. By utilizing a single design for each of the first and second gear boxes, while maintaining a desired functionality of the housing in each of the orientations, a manufacturing cost may be reduced.

In one example, the first gear box 120 controls a vehicle speed and the second gear box 130 controls a tow speed. In one example, the first gear box 120 and the second gear box 130 may be independent such that the gear boxes may be operated at different gear ratios relative to one another.

Herein, the vehicle 100 is at least partially electrically driven. In one example, the vehicle 100 is an all-electric vehicle comprising one or more batteries for powering one or more electric motors to drive the vehicle. In one example, the vehicle 100 is an all-electric passenger truck (e.g., a battery electric vehicle). It will be appreciated that the example of FIG. 1 may be applied to other transportation devices, such as planes, boats, trains, motorcycles, heavy-duty vehicles, and the like.

Turning now to FIG. 2, it shows a gear set 200. The gear set 200 may be identical to the first gear set 124 and/or the second gear set 134. An axis system 290 is shown comprising three-axes, namely an x-axis parallel to a horizontal direction, a y-axis parallel to a vertical direction, and a z-axis perpendicular to each of the x- and y-axes and parallel to a transverse direction. Herein, a width of gear set 200 is measured along the x-axis, a height is measured along the y-axis, and a depth is measured along the z-axis.

The gear set 200 may include an input shaft 210, a first layshaft 220, a second layshaft 230, and an output shaft 240. As such, the gear set 200 is a four stage gear set with two layshafts and two speeds. Overall, ratios of the gear set 200 may include 9.80:1 and 18.99:1. An output torque and top vehicle speed when operating at the 18.99:1 gear ratio may be equal to 7,872 Nm and 105 miles per hour, respectively. An output torque and top vehicle speed when operating at the 9.8:1 gear ratio may be equal to 4,067 Nm and about 50 miles per hour, respectively. In some examples, the ratios of the gear set 200 may be adjusted to increase or decrease the gear multiplication to adjust the output torque and/or the top vehicle speed at the different gear ratios without departing from the scope of the present disclosure.

The input shaft 210 may include a bearing 211. The bearing 211 may differ from previous examples of bearings in that the bearing 211 is configured as a four-point ball bearing configured to withstand axial loads, along with lateral loads. The bearing 211 may decrease a packaging size of the gear set 200 relative to double-row bearing or other bearings previously used in gear set assemblies.

The input shaft 210 may be engaged with and rotate the first layshaft 220, wherein gears 212 of the input shaft 210 are rotatably engaged with gears 222 of the first layshaft 220. The first layshaft 220 may be engaged with and rotate the second layshaft 230, wherein gears 222 of the first layshaft 220 are rotatably engaged with gears 232 of the second layshaft 230. The second layshaft 230 may be engaged with and rotate the output shaft 240, wherein gears 232 of the second layshaft 230 are rotatably engaged with an output gear 242 of the output shaft 240.

An electronic differential lock (EDL) 250 may be coupled to the output shaft 240. The EDL 250 may include splines in a side gear and trunnion inner diameter. The EDL 250 may comprise an eddy current sensor or other similar sensor for sensing a position along the output shaft 240. A more detailed view of the EDL 250 is illustrated in FIG. 3. The EDL 250 may be configured to adjust power transfer to one or more wheels, thereby providing all-wheel drive capabilities.

The first layshaft 220 may include two gears on needle bearings and one gear forged on a shaft. The first layshaft 220 may include a synchro assembly with one or more synchro components. The first layshaft 220 may include a ridged ring 224 arranged between the gears 222 configured to receive an actuator 260. The actuator 260 is illustrated in greater detail in FIGS. 8, 9, and 10. The actuator 260 may be an electric brushless actuator motor. Herein, the ridged ring 224 is referred to as a synchronizer 224.

More specifically, the input shaft 210 communicates with a first gear 222A of the first layshaft 220 via the input gear 212. The synchronizer 224 may be arranged between a second gear 222B and a third gear 222C, which are adjacent to one another. The second gear 222B may be arranged between the first gear 222A and the third gear 222C, wherein the first gear 222A is furthest from the synchronizer 224. In one example, the first gear 222A is forged onto the first layshaft 220 and the second gear 222B and the third gear 222C are arranged on needle bearings.

The second layshaft 230 comprises a first gear 232A which engages with the third gear 222C of the first layshaft 220. The second layshaft 230 further comprises a second gear 232B which engages with the second gear 222B of the first layshaft 220. The second gear 232B is arranged between the first gear 232A and a third gear 232C.

The output shaft 240 comprises the output gear 242 which engages with the third gear 232C of the second layshaft 230. The output gear 242 may further communicate with the EDL 250, which may adjust a transfer of power from the output gear 242 to one or more wheels. It will be appreciated that a rotational speed of the output gear 242 may be lower than a rotational speed of the input gear 212, which may result in increased torque. This may be desired during applications where the vehicle is towing, driving on a low-friction surface, or other similar conditions. However, during some conditions, it may be desired to increase the rotational speed of the output gear 242 to be more similar to the rotational speed of the input gear 212 such that a vehicle speed may increase and a torque output may decrease.

In one example, the gear set 200 comprises a reduced width relative to previous examples. For example, previous examples of gear sets comprise a width between 60 to 80 mm wider than the width of the gear set 200 of the present disclosure. As will be described in greater detail herein, the reduced width of the gear set 200 decreases packaging constraints, thereby reducing the packaging penalty of arranging two or more of the gear set 200 on the vehicle. Furthermore, a housing configured to house the gear set 200 may comprise one or more internal passages configured to provide sufficient lubricant flow despite the reduced size of the gear set and housing.

Turning to FIG. 3, it shows a detailed view 300 of the EDL 250. The EDL 250 may include a first differential half case 302 and a second differential half case 304. The first differential half case 302 may be a single piece manufactured separately from the second differential half case 304, wherein the second differential half case may also be manufactured as a single piece. A plurality of fasteners 306 may be configured to physically couple the first differential half case 302 to the second differential half case 304.

A ring gear 310 may be arranged between the first and second differential half cases 302 and 304. A plurality of bolt holes 312 may be configured to receive a plurality of bolts for physically coupling the ring gear to the first and second differential half cases. As illustrated, the plurality of bolt holes 312 may differ from openings for the plurality of fasteners 306. In one example, the plurality of fasteners 306 are screws and are present at a lower number than the plurality of bolt holes 312.

The EDL 250 may further include differential pins 320 arranged adjacent to the ring gear 310. The differential pins 320 may provide feedback to an actuator 330, regarding a rotational speed of the ring gear 310. The actuator 330 may include a sensor 322 and an actuator 324. In one example, the sensor 322 is a position sensor, such as an eddy current sensor, and the actuator 324 is a solenoid actuator.

The EDL 250 further comprises an oil groove 340, configured to provide oil to the output shaft (e.g., output shaft 240 of FIG. 2).

With respect to previous examples, packaging of the EDL 250 is reduced. Due to the packaging reduction, a gear clearance of the ring gear 310 relative to the first and second differential case halves. The packaging may be reduced due to an enhancement of oil flow through the oil groove 340, thereby allowing a reduction in a size of the oil groove 340 relative to other lubricating grooves in EDLs.

Turning now to FIG. 4A, it shows a first side view 400 of a gear box housing 410. FIG. 4B shows a second side view 450 of the gear box housing 410. The input shaft 210 and output shaft 240 are shown in the first side view 400 and a portion of the EDL 250 is shown in second side view 450. In one example, the gear box housing 410 is configured to mount in both front and rear configurations. That is to say, the gear box housing 410 comprises a configuration that enables the gear box housing 410 to be mounted on the first shaft 102 and the second shaft 112 of FIG. 1.

As illustrated, the input shaft 210 is exposed via a first opening 412. The first opening 412 comprising a plurality of through-holes 414 extending around a circumference thereof. The plurality of through-holes 414 may be configured to receive one or more fasteners for interfacing (e.g., physically coupling) the first opening 412 to an E-motor or to an E-motor adapter.

The output shaft 240 is viewable through a second opening 422. The second opening 422 may be a through-hole in one example. In one example, the second opening is smaller than the first opening 412.

In one example, the gear box housing 410 may include two halves, including a first half 432 and a second half 434. The first half 432 may be physically coupled to the second half 434 via a plurality of fasteners 436 which extend through a plurality of through holes 438. In one example, the plurality of through holes 438 may include a first plurality of through holes 438A and a second plurality of through-holes 438B, wherein the first plurality is arranged on a spine of the first half 432 and the second plurality is arranged on a spine of the second half 434. The first and second pluralities may align with one another along the x-axis and allow a fastener to extend through aligned through-holes. In one example, the plurality of through-holes 438 are threaded to match a threading of the fastener.

The gear box housing 410 may further include a mounting section 440 including a plurality of protrusions 442 with receiving holes 444 arranged therein. Fasteners may be used to physically couple the gear box housing 410 to a vehicle underbody, a shaft, or other portion of the vehicle via one or more of the protrusions 442 and the receiving holes. In one example, there are four protrusions, wherein each protrusion comprises two receiving holes. In some examples, mounting the gear box housing 410 may comprise where less than all of the protrusions 442 are used to mount the gear box housing 410. In one example, an embodiment of the gear box housing 410 arranged on a first shaft may use a first set of the protrusions 442 while an embodiment of the gear box housing 410 arranged on a second shaft may use a second set of the protrusions 442, wherein the second set comprises at least one protrusion different than the first set. As such, orientations of the gear box housing 410 on the different drive shafts may be adjusted.

The gear box housing 410 may further include a vent valve 480 arranged in a highest location of the gear box housing 410. In one example, the vent valve 480 is located at a highest point in both a first shaft orientation and a second shaft orientation. FIG. 13A illustrates a first shaft orientation 1300 and FIG. 13B illustrates a second shaft orientation 1350 of the gear box housing 410. The first shaft orientation 1300 of the gear box housing 410 may include where an angle measured from an output shaft to an input shaft may be between 90 to 110 degrees relative to the horizontal direction. In one example, the angle is between 95 to 105 degrees. In one example, the angle is 90 degrees or greater.

In the second shaft orientation 1350 of the gear box housing 410, an angle measured from the output shaft to the input shaft may be between 10 to 30 degrees relative to the horizontal direction. In one example, the angle is less than 25 degrees.

Turning now to FIGS. 5A and 5B, they show exterior 500 and internal 525 views of the first half 432 of the gear box housing 410. As shown, the first half 432 comprises lubrication passages 510 extending proximal to openings of the first half including the first opening 412 and the second opening 422. Gaskets 512, 513, 514, 515, 516, 517, and 518 may be arranged around the openings along with other portions of the first half 432 where lubricant may flow.

Turning now to FIGS. 5C and 5D, they show exterior 550 and internal 575 views of the second half 434 of the gear box housing 410. As shown, the second half 434 comprises lubrication passages 560 extending proximal to openings of the first half including the first opening 412 and the second opening 422. Similar to the lubrication passages 510 of the first half 432, the lubrication passages 560 may be separate from one another such that the lubrication passages 560 are segmented and correspond to different shaft of a gear set arranged in the gear box housing. However, lubricant in different zones of the gear box housing 410 may pool in a lowest portion of the gear box housing 410 and drain therefrom and return to a lubrication system arranged outside of the gear box housing 410 to flow to other components and/or return to the gear box housing 410. In this way, each of the different gears and shafts, including the input shaft, the first gear set, the second gear set, and the output shaft may individually receive lubricant. Drains may be arranged in a lowest portion of the housing corresponding to each of the input shaft, the first gear set, the second gear set, and the output shaft.

Turning now to FIG. 6A, a cross-section 600 of the gear box housing 410 is illustrated. In one example, the cross-section 600 corresponds to a first embodiment of the gear box housing 410 arranged on a first shaft of a vehicle (e.g., a cross-section of the embodiment illustrated in FIG. 13A). The cross-section 600 reveals the first layshaft 220 and the input shaft 210. As illustrated, an oil port 610 is arranged adjacent to the actuator 260 and the first gear 222A. The oil port 610 is arranged in an upper region of the gear box housing 410. Oil may flow into various portions of the gear box housing 410 including an internal oil passage 612 of the first layshaft 220. As illustrated, the internal oil passage 612 comprises connecting passages 614 for flowing oil to needle bearings of the second gear 222B and the third gear 222C. As described above, the first gear 222A may be forged on the first layshaft 220.

The internal oil passage 612 may include a flow tube 616 which directs oil flow down the first layshaft 220. The oil may flow through the connecting passages 614 and into needle bearings between the second gear 222B and the first layshaft 220. More detailed views of the flow tube are illustrated in FIGS. 6B and 6C.

In one example, an external pump 618 may supply lubricant to the oil port 610. By utilizing the external pump 618, the gear box housing 410 may be arranged in multiple orientations while still lubricating various gears and shafts to a desired threshold. The connecting passages 614 may extend normally from the flow tube 616, wherein the connecting passages may spray, jet, or direct lubricant to different radii of the first layshaft 220. More specifically, the connecting passages 614 may lubricate bearings 622B and 622C of the second gear 222B and the third gear 222C, respectively. Lubricant may then flow downward toward the input shaft 210 and other components housed within the gear box housing 410.

Turning to FIGS. 6B and 6C, they show views 625 and 650, respectively, of the flow tube 616 and the internal oil passage 612. Oil may flow through the internal oil passage 612 to the flow tube 616. The flow tube 616 may include an outer interface 626. The outer interface may include a lower portion 627 and extending toward a divider 628. The divider 628 may comprises a V shape, wherein an opening of the internal oil passage is arranged adjacent to a lowest portion of the divider 628. Once oil reaches a flat portion 617 of the flow tube 616, above the divider 628, the oil may spill over and enter a distribution channel 629. Lubricant from the distribution channel 629 may lube the bearing on the first layshaft 220 along with other components of the gear box. The flow tube 616 further comprises spray nozzles 615 fluidly coupled to the connecting passages 614.

Turning now to FIG. 7, it shows a cross-section 700 of the gear box housing 410. In one example, the cross-section 700 corresponds to a second embodiment of the gear box housing 410 arranged on a second shaft of a vehicle (e.g., a cross-section of the embodiment illustrated in FIG. 13B). The cross-section 700 reveals the first layshaft 220 and the input shaft 210, similar to the cross-section 600 of FIG. 6A. An oil port 710 is arranged proximal to the first gear 222A and distal to the third gear 222C. The oil port 710 directs lubricant directly to a lubricant passage 712 arranged proximally to the first opening 412. As such, the oil port 710 is arranged in a location different than the oil port 610 of FIG. 6A. In this way, a combination of the oil port 610 and the oil port 710 may be used to lubricant the various gears and shafts from different positions. As illustrated, the oil port 610 may be a first oil port and is adjacent to the actuator 260 and the oil port 710 may be a second oil port is opposite the oil port 610 and adjacent to the first opening 412. In one example, the oil port 610 is arranged on a first half of the gear box housing and the oil port 710 is arranged on a second half of the gear box housing. In some examples, the oil port 610 and the oil port 710 are identical, wherein the oil port 710 differs from the oil port 610 in that its orientation is the second orientation and the orientation of the oil port 610 is the first orientation.

Turning now to FIGS. 8, 9 and 10, they illustrate a detailed view of the actuator 260 of FIG. 2 and are described in tandem herein. In one example, the actuator 260 may be a non-limiting example of the motor 122 or the motor 132 of FIG. 1. The actuator 260 comprises a brushless, DC motor 1002, a housing 1004, a shift fork 1006, a travel sensor 1008, a magnet holder 1010, a plurality of snap rings 1012, a roller bearing 1014, a lead screw 1016, and a shaft 1018.

The motor 1002 is arranged at a first extreme end of the actuator 260 outside of the housing 1004. A number of the plurality of snap rings 1012 are arranged between the motor 1002 and the roller bearing 1014. A remaining number of the plurality of snap rings 1012 are arranged on an opposite side of the roller bearing 1014 distal to the motor 1002. The lead screw 1016 extends from the roller bearing 1014 to the shaft 1018. The shaft 1018 comprises a plurality of bushings 1022 wherein the shift fork 1006 is arranged between adjacent bushings 1022.

The shift fork 1006 extends in a direction perpendicular to an axis 1099 of the shaft 1018. The shift fork 1006 may interface and engage with the synchronizer 224 of the first layshaft 220 (with reference to FIG. 2). The travel sensor 1008 may be used to determine an engage gear, and thereby a gear ratio. The travel sensor 1008 may be coupled to the actuator 260 via the magnet holder 1010. That is to say, the travel sensor 1008 may be magnetically coupled to the actuator 260.

Turning now to FIG. 11, it shows a perspective view 1100 illustrating arrangements of one or more sensors on a gear box housing 1110. In one example, the gear box housing 1110 may be a non-limiting example of gear box housing 410 of FIGS. 4A and 4B. The gear box housing 1110 comprises an eddy current sensor 1120, a first speed sensor 1122, a second speed sensor 1124, and a position sensor 1126. In one example, the position sensor 1126 may be similar to the travel sensor 1008 of FIG. 10.

Turning now to FIG. 12, it shows an embodiment 1200 of the first layshaft 220 of FIG. 2. In the embodiment 1200, the first layshaft comprises a crawl gear 1210 arranged between the synchronizer 224 and the second gear 222B. In one example, the first speed sensor 1122 may correspond to the crawl gear 1210. The embodiment 1200 further comprises a cruise gear 1220 arranged on an extreme end of the first layshaft 220 adjacent to the third gear 222C and distal to the first gear 222A. In the embodiment 1200, the third gear 222C is between the synchronizer 224 and the cruise gear 1220. The second speed sensor 1124 of FIG. 11 may correspond to the cruise gear 1220.

In one example, the speed sensors, (e.g., crawl gear 1210 and the cruise gear 1220), provide a delta rpm across the synchronizer 224. This may allow a phase matching between a gear/synchro teeth to the other gear teeth or detect when the speed difference across the synchro is below a threshold rpm. This may assist in a smoothness of a shift and NVH. In one example, the arrangement of the example of FIG. 12 may allow for the omission of a synchro cones and operation similar to a dog clutch.

In this way, a gear box housing may comprise a compact shape with a reduced width relative to previous examples while housing a four stage gear set. The gear box housing is shaped to house the actuator and the electronic differential lock in combination with the four stage gear set in a reduced package size. The technical effect of reducing the packaging size of the gear set housing is to enhance lubrication, reduce packaging constraints, and reduce manufacturing costs. By reducing the packaging size, weight and packaging penalties may be reduced, such that independent gear sets may be arranged on a first shaft and a second shaft of the vehicle.

An embodiment of a system, comprises a gear box housing configured to house a four stage gear set in combination with a shift actuator and a differential lock, wherein the four stage gear set comprises an input shaft, a first layshaft, a second layshaft, and an output shaft. A first example of the system further includes where the gear box housing comprises a reduced width, wherein the reduced width is reduced by 60 to 80 mm. A second example of the system, optionally including the first example, further includes where the shift actuator is engaged with a synchronizer of the first layshaft, wherein the synchronizer is arranged between adjacent gears on needle bearings. A third example of the system, optionally including one or more of the previous examples, further includes where the first layshaft further comprises a gear forged to a shaft of the first layshaft. A fourth example of the system, optionally including one or more of the previous examples, further includes where the second layshaft comprises a number of gears similar to a number of gears of the first layshaft. A fifth example of the system, optionally including one or more of the previous examples, further includes where the differential lock is an electronic differential lock arranged on the output shaft. A sixth example of the system, optionally including one or more of the previous examples, further includes where the gear box housing is arranged on a front and a rear shaft of a battery electric vehicle. A seventh example of the system, optionally including one or more of the previous examples, further includes where a manual or an electronic parking brake.

An embodiment of a vehicle, comprises a first shaft coupled to a first set of wheels, a second shaft coupled to a second set of wheels, and a gear box housing arranged on each of the first shaft at a first orientation and the second shaft at a second orientation. A first example of the vehicle further includes where the gear box housing comprises a single oil inlet port. A second example of the vehicle, optionally including the first example, further includes where the gear box housing further comprises a vent valve, and wherein the vent valve is arranged in a highest point of the gear box housing in each of the first orientation and the second orientation. A third example of the vehicle, optionally including one or more of the previous examples, further includes where the gear box housing on the first shaft is configured to adjust a vehicle speed. A fourth example of the vehicle, optionally including one or more of the previous examples, further includes where the gear box housing on the second shaft is configured to adjust a tow speed. A fifth example of the vehicle, optionally including one or more of the previous examples, further includes where the gear box housing comprises a plurality of protrusions configured to mate with a vehicle underbody, wherein a first set of the plurality of protrusions are used to arrange the gear box housing in the first orientation and a second set of the plurality of protrusions are used to arranged the gear box housing in the second orientation, wherein the second set one or more different protrusions of the plurality of protrusions than the first set. A sixth example of the vehicle, optionally including one or more of the previous examples, further includes where the first orientation comprises where an angle measured from horizontal between an output shaft and an input shaft of the gear box housing is greater than 90 degrees, and wherein the second orientation comprises where the angle measured from horizontal between the output shaft and the input shaft of the gear box housing is less than 25 degrees.

An embodiment of a gear box housing, comprises an input shaft, a first layshaft, a second layshaft, and an output shaft, wherein the gear box housing is configured to be arranged on a first shaft at a first orientation and on a second shaft at a second orientation different than the first. A first example of the gear box housing further includes where a flow tube is configured to receive lubricant from a port, wherein the flow tube comprises a divider that flows lubricant to bearings of the first layshaft in response to lubricant reaching an upper portion of the flow tube, and wherein an external pump is configured to supply lubricant to the port. A second example of the gear box housing, optionally including the first example, further includes where the flow tube comprises nozzles configured to spray lubricant toward an inner diameter of the second shaft. A third example of the gear box housing, optionally including one or more of the previous examples, further includes where the gear box housing includes a first half and a second half, and wherein the second half includes a plurality of protrusions configured to couple to an underbody of a vehicle. A fourth example of the gear box housing, optionally including one or more of the previous examples, further includes where a first set of the plurality of protrusions are used to arrange the gear box housing in the first orientation and a second set of the plurality of protrusions are used to arranged the gear box housing in the second orientation, wherein the second set one or more different protrusions of the plurality of protrusions than the first set.

It will be appreciated that the configurations and routines disclosed herein are exemplary in nature, and that these specific embodiments are not to be considered in a limiting sense, because numerous variations are possible. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a front shaft of a vehicle;
a rear shaft of the vehicle;
a shift actuator;
a differential lock; and
a single gear box housing configured to house a four stage gear set, wherein the four stage gear set comprises an input shaft, a first layshaft, a second layshaft, an output shaft, and a vent valve,
wherein the single gear box housing is configured to be oriented in a first orientation on the front shaft of the vehicle and in a second orientation, different from the first orientation, when assembled to the rear shaft of the vehicle, and
wherein the vent valve is arranged at a common highest point of the single gear box housing in both the first orientation and the second orientation.

2. The system of claim 1, wherein the shift actuator is engaged with a synchronizer of the first layshaft, and wherein the synchronizer is arranged between adjacent gears on needle bearings.

3. The system of claim 2, wherein the first layshaft further comprises a gear forged to a shaft of the first layshaft.

4. The system of claim 1, wherein the second layshaft comprises a number of gears equal to a number of gears of the first layshaft.

5. The system of claim 1, wherein the differential lock is an electronic differential lock arranged on the output shaft.

6. The system of claim 1, wherein the vehicle is a battery electric vehicle, and wherein the first orientation is different than the second orientation relative to an angle measured from horizontal to the output shaft.

7. The system of claim 1, further comprising a manual or an electronic parking brake.

8. A vehicle, comprising:
a first shaft coupled to a first set of wheels;
a second shaft coupled to a second set of wheels; and
a single gear box housing configured to be arranged on each of the first shaft at a first orientation and the second shaft at a second orientation different than the first orientation, wherein the single gear box housing comprises only a single oil inlet port and a vent valve, and wherein the vent valve is arranged at a common highest point of the single gear box housing in both the first orientation and the second orientation.

9. The vehicle of claim 8, wherein the single gear box housing on the first shaft is configured to adjust a vehicle speed via adjusting a speed of an output shaft relative to an input shaft.

10. The vehicle of claim 9, wherein the single gear box housing on the second shaft is configured to adjust a tow speed via a rotational speed of an output gear being lower than a rotational speed of an input gear.

11. The vehicle of claim 8, wherein the single gear box housing of the first and second shafts comprises a plurality of protrusions configured to mate with a vehicle underbody, wherein a first set of the plurality of protrusions is used to arrange the single gear box housing in the first orientation and a second set of the plurality of protrusions is used to arranged the single gear box housing in the second orientation, wherein the second set has one or more different protrusions of the plurality of protrusions than the first set, and wherein the single gear box housing of the first and second shafts comprises the first and second sets of the plurality of protrusions.

12. The vehicle of claim 8, wherein the first orientation comprises where an angle measured from horizontal between an output shaft and an input shaft of the single gear box housing is greater than 90 degrees, and wherein the second orientation comprises where the angle measured from horizontal between the output shaft and the input shaft of the single gear box housing is less than 25 degrees.

13. A single gear box housing, comprising:
an input shaft;
a first layshaft;
a second layshaft; and
an output shaft,
wherein the single gear box housing comprises a vent valve and is configured to be arranged on a first shaft, configured to drive a first set of wheels at a first orientation, and on a second shaft, configured to drive a second set of wheels at a second orientation different than the first orientation, and the vent valve is arranged at a common highest point of the single gear box housing in both the first orientation and the second orientation.

14. The single gear box housing of claim 13, wherein a flow tube is configured to receive lubricant from a port, wherein the flow tube comprises a divider that flows lubricant to bearings of the first layshaft in response to lubricant reaching an upper portion of the flow tube, and wherein an external pump is configured to supply lubricant to the port.

15. The single gear box housing of claim 14, wherein the flow tube comprises nozzles configured to spray lubricant toward an inner diameter of the second shaft.

16. The single gear box housing of claim 13, wherein the single gear box housing includes a first half and a second half, and wherein the second half includes a plurality of protrusions configured to couple to an underbody of a vehicle.

17. The single gear box housing of claim 16, wherein a first set of the plurality of protrusions is used to arrange the single gear box housing in the first orientation and a second set of the plurality of protrusions is used to arranged the single gear box housing in the second orientation, and wherein the second set has one or more different protrusions of the plurality of protrusions than the first set.

* * * * *